May 6, 1969 T. K. LAKSHMANAN 3,443,103
PHOTOCONDUCTIVE CELL HAVING HIGH STABILITY AND DARK RESISTANCE
Filed March 16, 1966
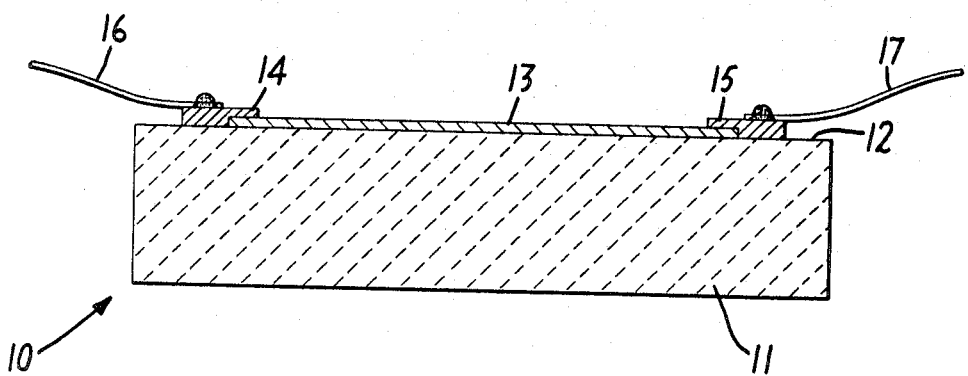
INVENTOR.
TAVORATH K. LAKSHMANAN
BY
Brumbaugh, Free, Graves & Donohue
his ATTORNEYS

United States Patent Office 3,443,103
Patented May 6, 1969

3,443,103
PHOTOCONDUCTIVE CELL HAVING HIGH STABILITY AND DARK RESISTANCE
Tavorath K. Lakshmanan, Matawan, N.J., assignor to Weston Instruments, Inc., Newark, N.J., a corporation of Delaware
Filed Mar. 16, 1966, Ser. No. 534,690
Int. Cl. H01j *39/12*
U.S. Cl. 250—211    9 Claims

ABSTRACT OF THE DISCLOSURE

In the particular embodiment of the invention described herein, a photoconductive cell is prepared by mixing cadmium selenide with four percent by weight of cadmium chloride and 0.02% by weight of cupric chloride, and then heating the mixture at 800° C. for thirty minutes. After cooling, the mixture is ground and applied to a substrate and then heated at 600° C. for ten minutes.

---

This invention relates to photoconductive cells and, more particularly, to a new and improved photoconductive cell having high stability, superior sensitivity and improved power dissipation.

Heretofore, commercially available photoconductive cells have had poor stability on a long term basis and those cells having the desired characteristics have not been readily reproducible. Moreover, the dark resistance of certain types of photoconductive cells has not been high enough for many applications and the ratio of dark resistance to light resistance has not been as great as is desirable.

Accordingly, it is an object of the present invention to provide a new and improved photoconductive cell which eliminates the above-mentioned disadvantages of the present cells.

Another object of the invention is to provide a method of making an improved photoconductive cell.

These and other objects of the invention are attained by utilizing as a photosensitive material cadmium selenide mixed with small quantities of cadmium chloride and cupric chloride. Preferably, the cadmium chloride content of the photoconductive material is within the range from about 1% to 10% by weight and, for best results, the proportion is within the range from 3% to 5%. The cupric chloride content is within the range from a few thousandths of 1% to several hundredths of 1% and, for optimum results, the content is preferably within the range from one one-hundredth percent to three one-hundredths percent by weight.

To prepare a photoconductive cell, a mixture having the foregoing proportions is activated by heating at about 700° C. to about 900° C. and preferably within the range from 750° C. to 800° C. and is then cooled and ground to a powder. An alcohol suspension of the powder is applied to a substrate, preferably by spraying, and the coated substrate is sintered at a temperature of about 550° C. to 650° C. and preferably within about 590° C. to 610° C.

Further objects and advantages of the invention will be apparent from a reading of the following description in conjunction with the accompanying drawing which is a cross-sectional view illustrating the arrangement of a typical photoconductive cell according to the invention. In the illustrated embodiment, a photoconductive cell 10 comprises a ceramic base member or substrate 11 coated on one surface 12 with a layer 13 of cadmium selenide material prepared in the manner described below. Two terminals 14 and 15 of Wood's metal contacting the photoconductive layer 13 at opposite ends have corresponding wires 16 and 17 affixed to them by soldering or the like.

In a particular example of the method according to the invention, 0.10 gram of cupric chloride was dissolved in pure distilled water to make up 100 ml. of cupric chloride solution and 20.0 grams of cadmium chloride was dissolved in pure distilled water to make up 100 ml. of cadmium chloride solution. One ml. of each of the cupric chloride and cadmium chloride solutions was added to a 5.00 gram sample of cadmium selenide powder in a quartz crucible and the mixture was stirred slowly until thoroughly distributed, care being taken to prevent occurrence of trapped air bubbles. The quartz crucible was covered and transferred to a drying oven and dried at 120° C. until the mixture was hard and dried. Thereafter, the crucible was removed from the oven and cooled to room temperature with the cover on.

In order to activate the mixture, the crucible was then placed in an electric furnace and heated for thirty minutes at 800° C. After the crucible had cooled to room temperature, the mixture was removed and ground into a fine powder in a glass mortar and was then stored in a dry container having less tan 40% humidity until the next step in the process.

About two grams of the activated cadmium selenide powder was mixed with about one ml. of isoamyl alcohol to produce a suspension having a proper consistency to be sprayed. This suspension was sprayed onto a clean and dry alumina ceramic substrate which was masked to provide the proper outline for the sensitive area of the cell, the spraying being done at a distance of about one foot with a Paasche air brush using pure, dry nitrogen gas at 30 p.s.i. The spraying was accomplished in a single pass over the entire substrate to provide a uniform coating which was thick enough to prevent any visible appearance of the white substrate through the coating. Usually, a thickness of a few thousandths of an inch is adequate.

Following the spray coating, the mask was removed from the substrate carefully so as to prevent detachment of the cadmium selenide layer and the coated substrate was covered and allowed to dry for about a half hour. The substrate was then sintered in an electric furnace for ten minutes at a temperature of 600° C. and removed from the furnace and cooled to room temperature before being transferred to a dry container. After storage in the dry container for twenty-four hours, electrodes were applied to the cell by spraying Wood's metal through an appropriate mask from a distance of about one foot. Care was taken to make certain that the mask was in good contact so as to prevent any of the Wood's metal from reaching the sensitive area of the cell.

The completed cell, having a photosensitive cadmium selenide coating containing 4% by weight of cadmium chloride and two-one-hundredths of 1% by weight of cupric chloride and consisting of a sensitive area of 500 squares in parallel, was found to have a resistance in total darkness of about 10 billion ohms and a resistance under intense illumination of about 10 ohms, yielding a dark/light resistance ratio of about one billion. Moreover, the cell was found to be quite stable throughout a test period of several years, in contrast to prior cells which tend to become unstable after about a year.

Another advantage of cells made according to the invention is their ability to dissipate about twice the power of prior art cells. Furthermore, without taking any unusual precautions in the manner of preparation of the cells, the photoconductive cells made according to the invention have a light resistance range within a factor of about two or three, which is considerably better than many of the prior art cells.

Throughout the fabrication process, the usual steps should be taken to avoid contamination of the components and the ceramic substrate, as by covering and handling with forceps, and the operations should be carried out in a fairly dry atmosphere, preferably less than about 40% humidity. Except for such precautions, however, the fabrication process is considerably simpler than prior art processes. In particular, no binders or fluxes are used and no controlled atmosphere is required during the mixing and heating operations. There are only two major steps in the entire fabrication process and no pregrinding or purification of the major constituent, cadmium selenide, is required, the commercially available powder being sufficiently fine. Also, there is no need for accurate particle size control in the ground sensitized powder.

Furthermore, the composition of the cadmium selenide mixture and the manner of carrying out the process may be varied within certain limits from the specific example set forth above. For example, the cadmium chloride content of the mixture may vary from about 1% to about 10% by weight but, for best results, a cadmium chloride content between about 3% and about 5% by weight is preferred. Similarly, the cupric chloride content may vary from a few thousandths of a percent to several hundredths of a percent by weight but preferably is between one one-hundredth percent and about three one-hundredths percent by weight.

With regard to the processing conditions, the cadmium selenide mixture may be activated by heating at any temperature within the range from about 700° C. to about 900° C. but preferably the activating temperature is within the range from about 750° C. to about 800° C. The sintering temperature is more critical and should be kept within about 50° C. of 600° C. and the best results are obtained when the sintering temperature is between about 590° C. and about 610° C. In addition, the alcohol suspension of activated cadmium selenide powder may be applied to the substrate by other methods than spraying as, for example, by painting.

Although the invention has been described herein with reference to specific embodiments, many modifications and variations therein will readily occur to those skilled in the art. Accordingly, all such variations and modifications are included within the intended scope of the invention as defined by the following claims.

I claim:

1. A photoconductive cell comprising a base member having a surface adapted to hold a layer of photosensitive material, a thin layer of a photosensitive material consisting of a mixture of cadmium selenide with from about one percent to about ten percent by weight of cadmium chloride and from a few thousandths of one percent to a few hundredths of one percent by weight of cupric chloride affixed to said surface, and a pair of terminals in electrical contact with said layer at spaced locations.

2. A process for preparing a photoconductive layer comprising mixing cadmium selenide with from about one percent to about ten percent by weight of cadmium chloride and from a few thousandths of one percent to a few hundredths of one percent by weight of cupric chloride, activating the mixture by heating it to a temperature within the range from about 700° C. to about 900° C. so as to render it photosensitive, grinding the mixture to a fine powder and adding fluid to form a suspension, coating the suspension upon a support member to form a thin layer, and sintering the layer on the support member by heating it to a temperature within the range from about 590° C. to about 610° C.

3. A photoconductive cell according to claim 1 wherein the cadmium chloride content of the mixture is within the range from about three percent to about five percent by weight.

4. A photoconductive cell according to claim 1 wherein the cupric chloride content of the mixture is within the range from one to three-hundredths of one percent by weight.

5. A process according to claim 2 wherein the step of mixing cadmium selenide with small quantities of cadmium chloride and cupric chloride is carried out by preparing aqueous solutions of cadmium chloride and cupric chloride, stirring selected volumes of the solutions with a selected quantity of cadmium selenide powder, and drying the mixture.

6. A process according to claim 2 wherein the cadmium selenide is mixed with about three percent to five percent by weight of cadmium chloride and about one-hundredth percent to three-thundredths percent by weight of cupric chloride.

7. A process according to claim 2 wherein the step of activating the mixture is carried out by heating it to a temperature within the range from about 750° C. to about 800° C. for approximately one-half hour.

8. A process according to claim 2 wherein the step of sintering is carried out by heating the layer to a temperature within the range from about 590° C. to about 610° C. for about ten minutes.

9. A process according to claim 2 wherein the step of coating the suspension is carried out by spraying the suspension upon the support member.

References Cited

UNITED STATES PATENTS

| | | | |
|---|---|---|---|
| 2,884,507 | 4/1959 | Czipott et al. | 338—15 |
| 3,191,045 | 6/1965 | Colman | 250—211 |
| 3,333,985 | 8/1967 | Berkenblit et al. | 117—212 |
| 2,957,152 | 10/1960 | Van Gool et al. | 338—15 |

OTHER REFERENCES

Briggs et al.: RCA Engineer, vol. 5, No. 4, December 1959, pp. 25–28.

WALTER STOLWEIN, *Primary Examiner.*

U.S. Cl X.R.

117—201; 252—501; 338—15